(12) United States Patent
Gerisch et al.

(10) Patent No.: US 6,336,674 B1
(45) Date of Patent: Jan. 8, 2002

(54) VEHICLE AND A WINDOW SYSTEM THEREFOR

(76) Inventors: Mark Gerisch, 3616 Briarwood La., Manitowoc, WI (US) 54220; Colton Hardison, 2804-G 39th St., Two Rivers, WI (US) 54241

( * ) Notice: Subject to any disclaimer, the term of this patent is extended or adjusted under 35 U.S.C. 154(b) by 0 days.

(21) Appl. No.: 09/716,285

(22) Filed: Nov. 21, 2000

Related U.S. Application Data

(60) Provisional application No. 60/243,437, filed on Oct. 27, 2000.

(51) Int. Cl.[7] .................................................. B60J 1/12
(52) U.S. Cl. ........................... 296/146.16; 296/146.15; 296/190.1; 296/92; 52/502
(58) Field of Search ...................... 296/146.16, 146.15, 296/190.1, 92, 216.05, 89, 201; 52/502

(56) References Cited

U.S. PATENT DOCUMENTS

| | | | | |
|---|---|---|---|---|
| 4,116,483 A | * | 9/1978 | Kramer et al. ................. 296/28 |
| 4,119,340 A | * | 10/1978 | Wolfe ........................ 296/137 |
| 4,358,151 A | * | 11/1982 | Wood ......................... 296/146 |
| 4,793,099 A | * | 12/1988 | Friese et al. ................. 296/146 |
| 4,880,269 A | * | 11/1989 | Jensen et al. ................ 296/190 |
| 5,096,253 A | * | 3/1992 | Jo et al. ..................... 296/190 |
| 5,362,118 A | * | 11/1994 | Houriez ...................... 296/190 |
| 5,791,727 A | * | 8/1998 | Doescher et al. ............. 296/190 |
| 5,921,911 A | * | 7/1999 | Townsend .................. 296/146.8 |
| 6,267,433 B1 | * | 7/2001 | Bayer et al. ................. 296/121 |

FOREIGN PATENT DOCUMENTS

| | | | |
|---|---|---|---|
| JP | 57 182520 | * | 11/1982 |
| JP | 57 191120 | * | 11/1982 |
| JP | 58 191626 | * | 11/1983 |
| JP | 62 184920 | * | 8/1987 |
| JP | 62 184921 | * | 8/1987 |
| JP | 1 175519 | * | 7/1989 |
| JP | 1 175522 | * | 7/1989 |

* cited by examiner

Primary Examiner—Joseph D. Pape
Assistant Examiner—Kiran B. Patel
(74) Attorney, Agent, or Firm—Oblon, Spivak, McClelland, Maier & Neustadt, P.C.

(57) ABSTRACT

A vehicle and a window system that provides a closed position where a window is positioned within a window opening, and an opened position where the window is moved out of the window opening and then moved to a position remote from the window opening. The window system includes a window connected to the vehicle via one or more connection members. The connection members are connected to a transport system mounted to a roof of the vehicle. The transport system allows the window and the connection members to rotate upward, and slid forward upon the transport system to an open position on the roof of the vehicle. The window can then be locked in the open position.

20 Claims, 6 Drawing Sheets

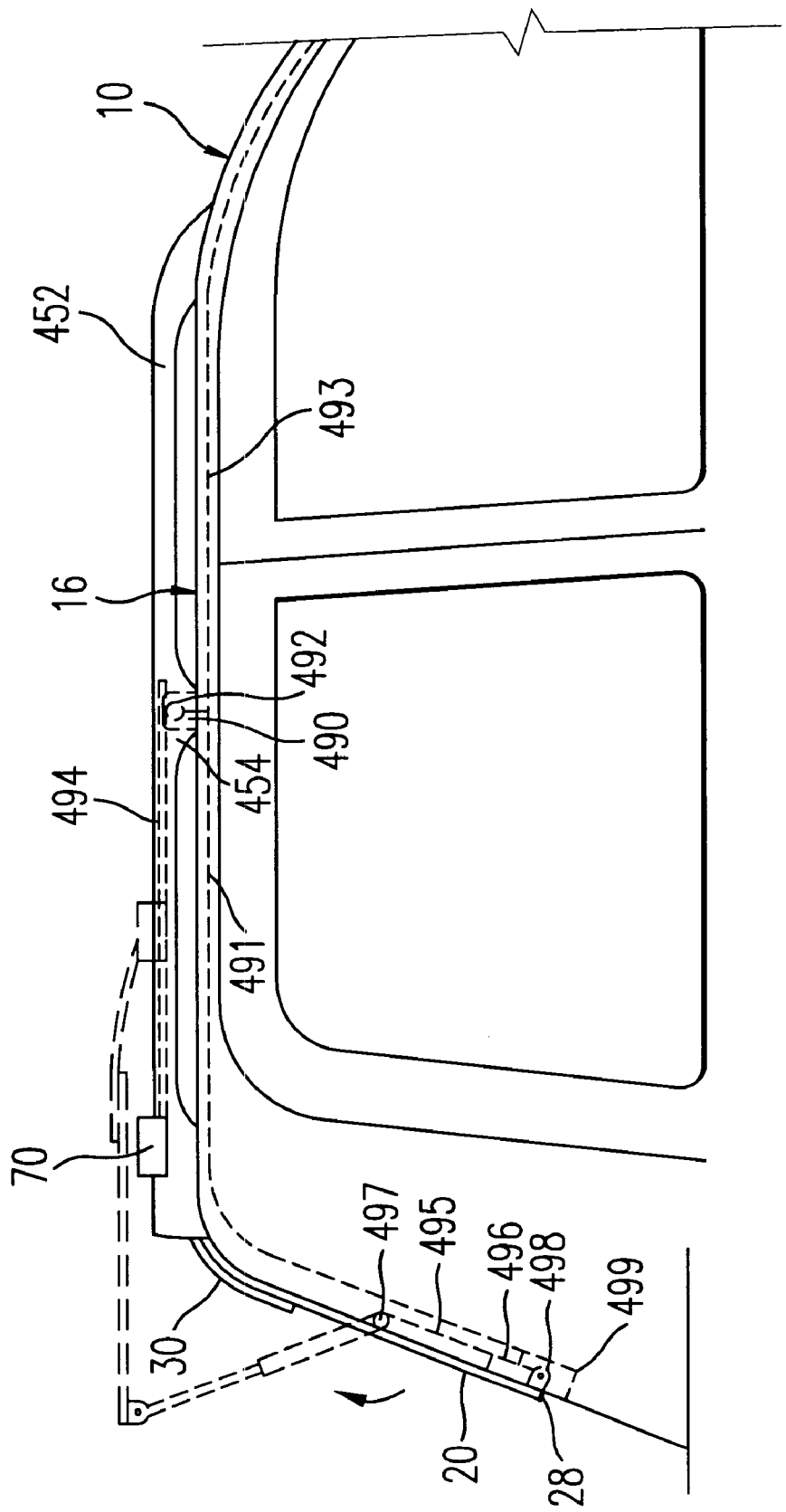

VEHICLE AND A WINDOW SYSTEM THEREFOR

CROSS-REFERENCE TO RELATED CO-PENDING APPLICATIONS

This application is related to the following co-pending applications: U.S. Provisional Application Serial No. 60/243,437, filed on Oct. 27, 2000. The provisional application is incorporated herein by reference in its entirety.

BACKGROUND OF THE INVENTION

1. Field of the Invention

The present invention relates generally to a window system that provides a closed position where a window is positioned within a window opening, and an opened position where the window is moved out of the window opening and then moved to a position remote from the window opening.

2. Discussion of the Background

Many sport utility vehicles and/or station wagon vehicles that utilize a rear window configuration that can be opened by retracting the window within a rear gate. If the structure of the gate is configured such that it is inconvenient or impossible to retract the window within the gate, the window is typically pivotally connected to the top of a window opening at the rear of the vehicle. In this configuration, the window is generally provided with extendable pistons that aid in lifting the window and help to maintain the window in the opened position. This configuration has several disadvantages. For example, the window is pivotally connected to the window opening, which means that even when the window is open, the window remains adjacent to the window opening. Therefore, the window is susceptible to damage caused by contact with materials or objects being loaded through the window opening. Furthermore, this configuration does not provide a stable open position for the window, which can allow the vehicle to be driven with the window in the open position. While the extendable pistons generally maintain the window in the open position, while the vehicle is stationary, the pistons do not provide enough support for the window to maintain the window in the open position when the vehicle is travelling over bumps or other obstacles in the road. In fact, the pistons must allow a vehicle operator to close the window if desired, and therefore the pistons cannot be configured to always maintain the window in the open position when the vehicle is travelling. Accordingly, a window supported in the open position by such pistons will typically bounce and rattle when the window is left in the open position during vehicle operation.

SUMMARY OF THE INVENTION

The present invention relates to a window system that provides a closed position where a window is positioned within a window opening, and an opened position where the window is moved out of the window opening and then moved to a position remote from the window opening.

Accordingly, the present invention advantageously provides a window system that can be incorporated into a vehicle having a window opening. The window system of the present invention can be used to modify or retrofit an existing vehicle or can be incorporated into a new vehicle construction. The present invention generally includes a window adapted to fit within the window opening. An upper portion of the window is connected to the vehicle via one or more connection members. The connection member has an upper portion that is connected to a transport member, which is part of a transport system mounted to the roof of the vehicle.

The transport system of the present invention includes the transport member, and one or more guide portions or rails that extend generally from the rear to the front of the vehicle's roof. An existing luggage rack of the vehicle can be utilized as the guide portions of the transport system, or, alternatively, an existing luggage rack can be removed and replaced by the guide portions or the guide portions can be added to a vehicle that does not have a luggage rack. The transport system, and more particularly the guide portions, provide a sliding mechanism by which the transport member, and thereby the window, can slide along the guide portions. The transport system includes brackets that interconnect the transport member and the guide portions, and are slidably received by the guide portions such that the brackets can slide along the lengths of the guide portion. The brackets include locking mechanisms that can be engaged to prevent the brackets from sliding or moving with respect to the guide portions, and disengaged to allow for the brackets to slide or move along the guide portions.

The present invention provides a window system that allows a window to move from a closed position where the window is positioned within the window opening, to an open position where the window is moved out of the window opening and moved to a position remote from the window opening. The window begins in the closed and, preferably, locked position, when the window is positioned within the window opening of the vehicle. In the closed position, the brackets are locked in position by the locking mechanisms of the brackets in order to prevent the brackets from sliding on the guide portions. The window is then unlatched and the window and the connection members are rotated upward about the transport member until the window is approximately horizontal. The brackets are unlocked, thereby allowing the brackets to freely slide upon the guide portions. The window, the connection members, the transport member, and the brackets are then slid forward on the guide portions, such that the window is slid forward to a position such that the lower edge of the window is forward of hook-shaped devices on the rearward ends of the guide portions. The window and the connection members are rotated downward until the lower edge of the window contacts the guide portions, and the window is then slid rearward such that the lower edge of the window is received within the hook-shaped devices. The brackets are locked in position by the locking mechanisms of the brackets in order to prevent the brackets from sliding on the guide portions. The window is thereby in the open and locked position, which is remote from the window opening.

The window can be returned to the closed position by simply reversing the above steps.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a side view of a transport system according to an alternative embodiment of the present invention.

DESCRIPTION OF THE PREFERRED EMBODIMENTS

Figure 1:
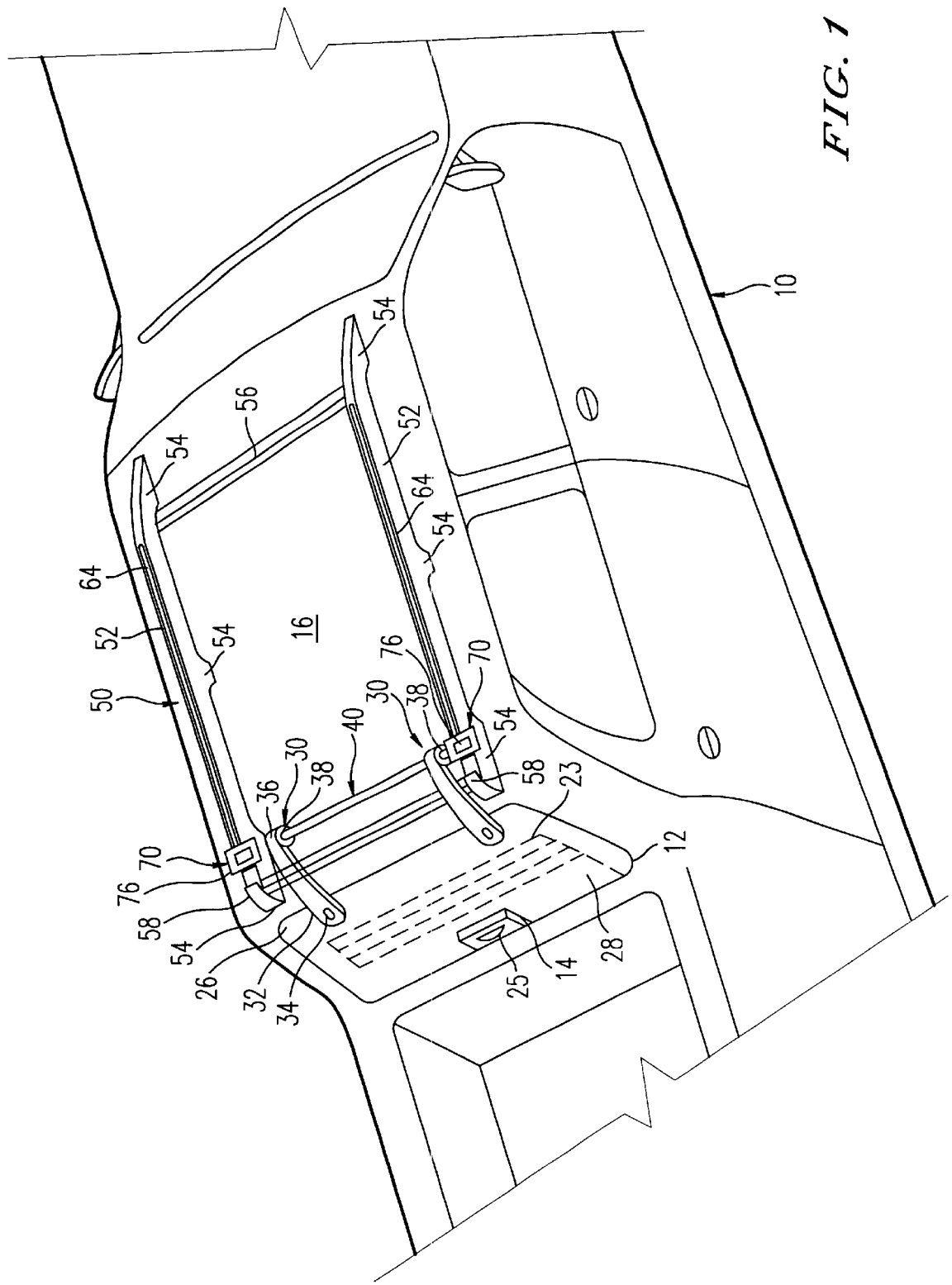
FIG. 1 is a perspective view of an embodiment of a window system of the present invention, where the window is in a closed and locked position.
Figure 2A:
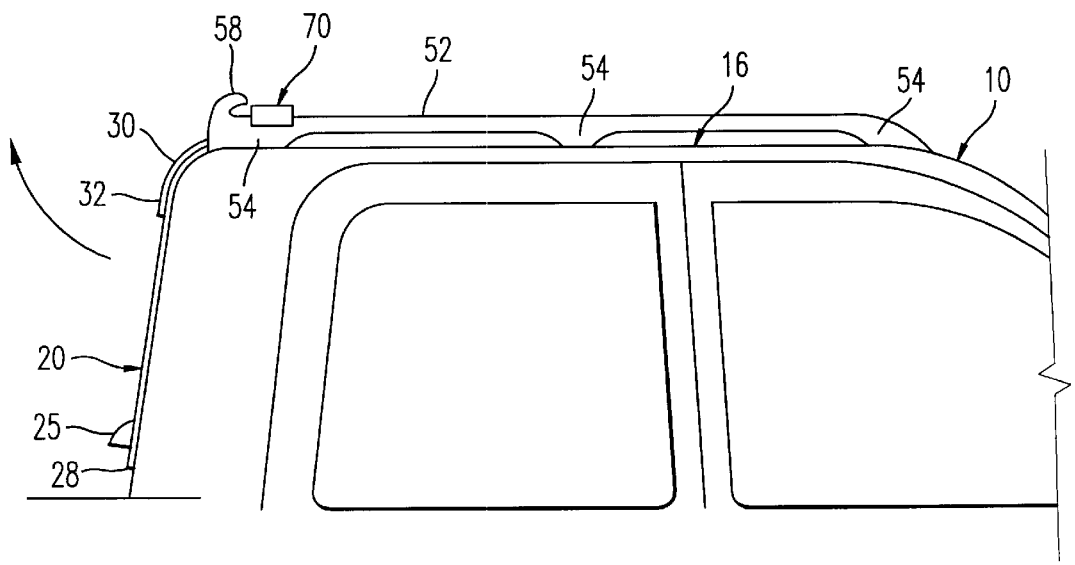
FIGS. 2A through 2D are side views of the embodiment of the window system depicted in FIG. 1, where the window shown being moved from a closed position in FIG. 2A to an open position in FIG. 2D.
Figure 2B:
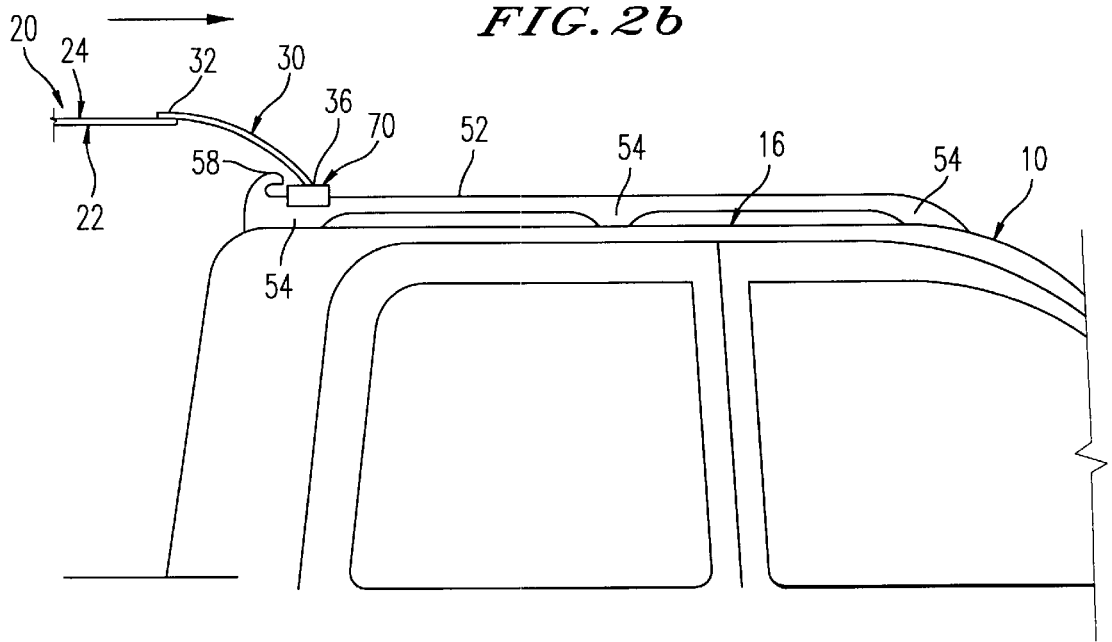
Figure 2C:
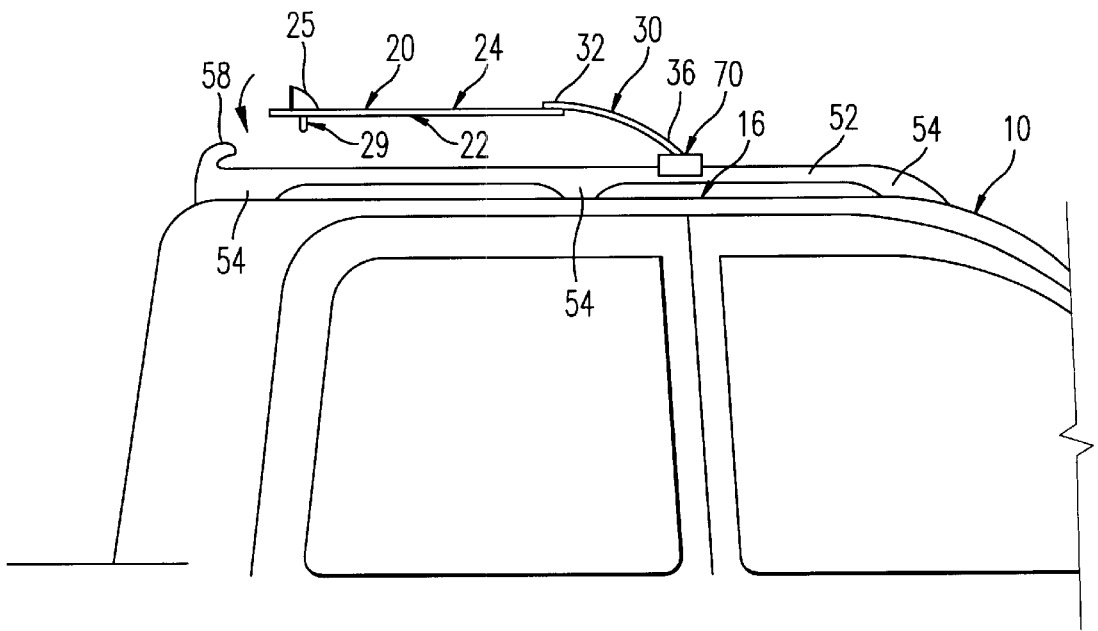
Figure 2D:
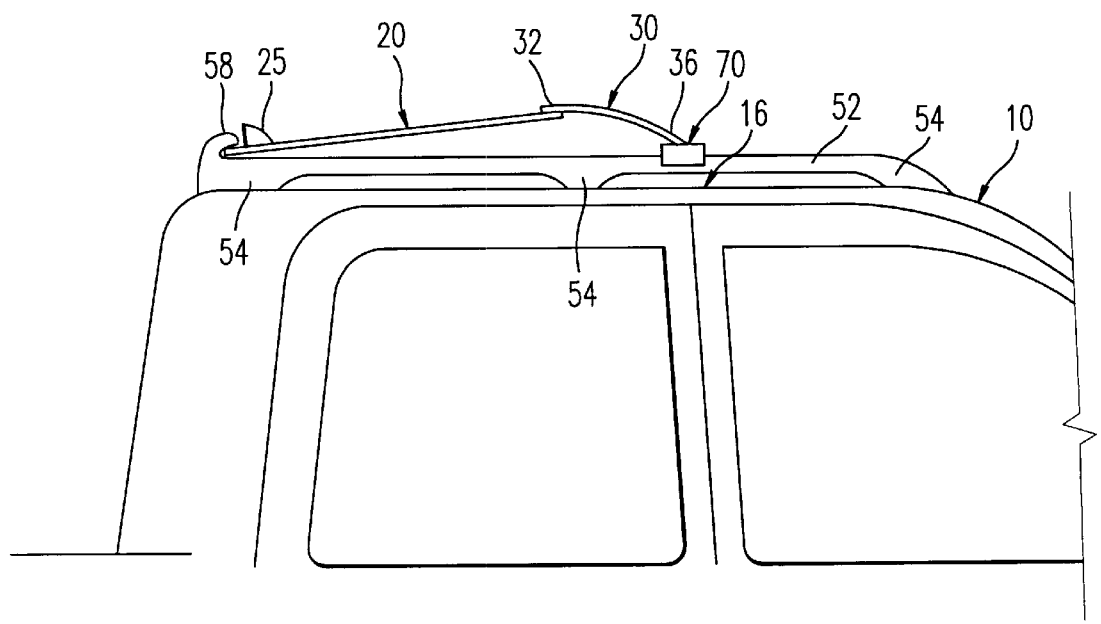
Figure 3:
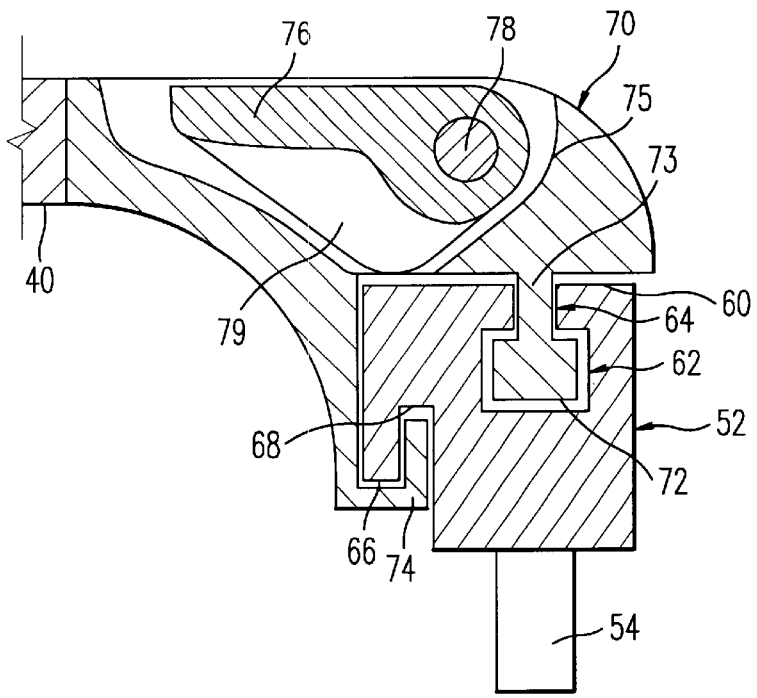
FIG. 3 is an enlarged, cross-sectional view of a bracket and a guide portion of the embodiment of the window system depicted in FIG. 1.

Referring now to the drawings, FIGS. 1 through 3 depict a first exemplary embodiment of a vehicle and a window system for a vehicle according to the present invention. FIGS. 4 through 7 depict various alternative embodiments of the vehicle and window system for a vehicle according to the present invention.

The present invention generally includes a window system that can be incorporated into a vehicle 10 having a window opening 12. The window system of the present invention can be used to modify or retrofit an existing vehicle or can be incorporated into a new vehicle construction. The present invention generally includes a window 20 adapted to fit within the window opening 12.

The window 20 has an interior surface 22 and an exterior surface 24. The interior surface of the window 20 preferably includes heating elements 23 for defrosting or defogging the window 20. The window opening 12 includes a locking mechanism 14 that is configured to releasably connect with a latch 29 on the interior surface 22 of near a lower edge 28 of the window 20. The latch 29 can be connected to a handle 25 on the exterior surface of the window 20. The locking mechanism 14 connects with the latch 29 when the window is in the closed position, as depicted in FIG. 1, whereby the window is fixed in the closed position. The locking mechanism 14 is configured to release the latch 29 either when a key or other mechanism is used to disengage the locking mechanism or when a remote release actuator or disengagement mechanism (not depicted) is actuated from inside the vehicle 10. Preferably, when in the closed position the window 20 fits within the opening 12 such that the window is relatively flush with the exterior of the vehicle 10 and such that the window 20 abuts seals (not depicted) provided around the perimeter of the window opening 12.

Figure 4:
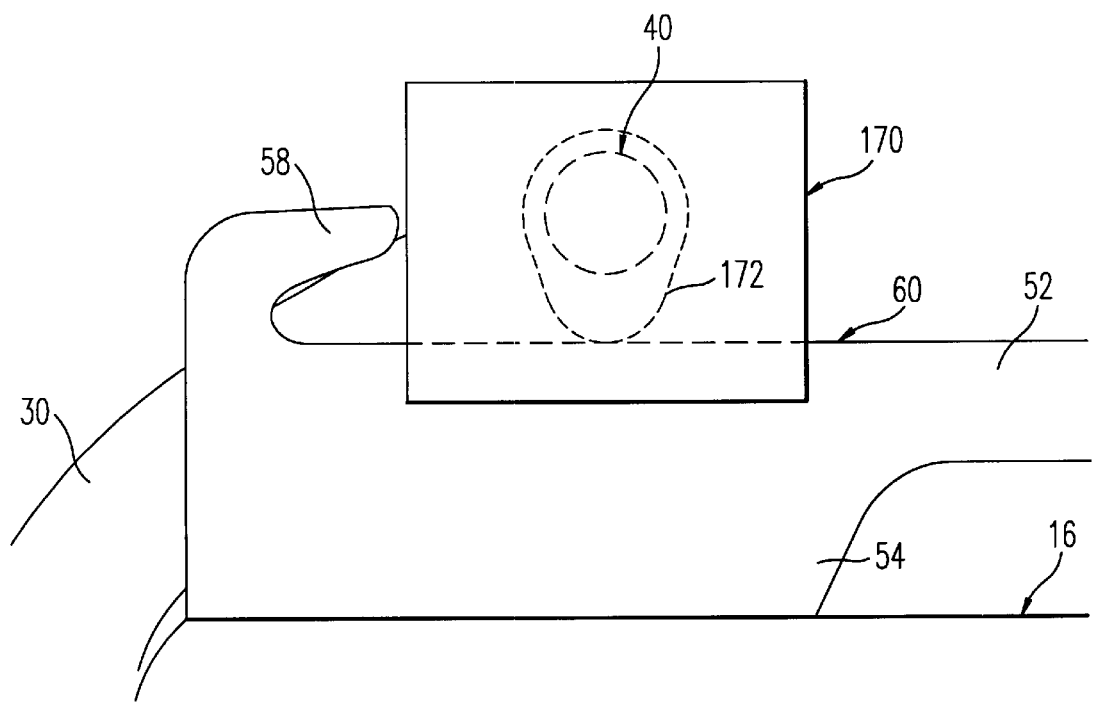
FIG. 4 is an enlarged side view of a bracket and a guide portion according to an alternative embodiment of a window system of the present invention.

The upper portion 26 of the window 20 is connected to the vehicle via one or more connection members 30. The window 20 is connected to the connection member 30 by a connection pin extending through a hole 34 in the connection member and a hole in the window 20, and/or by adhesive between the contacting surfaces of the window 20 and the connection member 30, and/or some other conventional mounting configuration. The connection member 30 is a rigid structure that can be formed of a rigid plastic material, or a coated rigid metal material, or other similar configurations. The connection member 30 has an upper portion 36 that is connected to a transport member 40 at joint 38. As depicted in FIG. 1, the connection member 30 can be rotatably connected to the transport member 40 at joint 38, which can be constructed to include bearings to ensure smooth and efficient rotation. Alternatively, the connection member can be non-rotationally connected to the transport member, and the transport member can be rotatably connected to a bracket, which is connected to a guide portion of the transport system, one embodiment of which is depicted in FIG. 4. Further alternatively, each of the connection members can be non-rotationally connected to a transport member (not depicted) that is configured as a pin, which extends into and is rotatably and slidably received by a channel in the guide portion of the transport system.

In the embodiment depicted in FIG. 1, the transport system 50 includes the transport member 40, and one or more guide portions or rails 52 that extend generally from the rear to the front of the vehicle 10. The guide portions 52 are mounted to a roof 16 of the vehicle at bases 54, for example, using a nut and bolt extending through the bases 54 and through the roof 16, and/or an adhesive between the contacting surfaces of the bases 54 and the roof 16, or some other conventional mounting configuration. An existing luggage rack of the vehicle 10 can be utilized as the guide portions 52 of the transport system 50, or, alternatively, an existing luggage rack can be removed and replaced by the guide portions 52 or the guide portions 52 can be added to a vehicle that does not have a luggage rack. An alternative embodiment of the present invention includes a transport system 50 with a single guide portion aligned in a center of the roof, although the guide portion would have to include a wide rail or other structure in order to provide stability to the transport system. Further alternatively, the transport system can include more than two guide portions, if so desired. The transport system 50 can include supports 56 that extend between the guide portions 52, thereby providing structural integrity to the transport system 50. The guide portions 52 include a device 58, such as a hook-shaped device as depicted in FIG. 1, preferably at the rearward end of the guide portions 52.

The transport system 50, and more particularly the guide portions 52, provide a sliding mechanism by which the transport member 40, and thereby the window 20, can slide along the guide portions 52. FIGS. 2A through 2D depict the motion of the window from a closed position (depicted in FIG. 2A) to an open and locked position (depicted in FIG. 2D). The configuration of the transport system 50 including the transport member 40 and the guide portions 52 can be configured in a wide variety of embodiments, as will be readily apparent to one of skill in the art based upon the teachings set forth in the present disclosure. The transport system 50 depicted in FIG. 1 includes brackets 70 that interconnect the transport member 40 and the guide portions 52. The brackets 70 are attached to the ends of the transport member 40. The brackets 70 are slidably received by the guide portions 52 such that the brackets 70 can slide along the lengths of the guide portions 52.

FIG. 3 depicts an embodiment of a bracket 70 and a guide portion 52. The guide portion 52 includes a top surface 60 with a channel 62 and a narrow slot 64 extending from the top surface 60 to the channel 62. A side of the guide portion 52 includes a downwardly extending lip 66, which defines a recess 68. The bracket 70 includes a pin member 72 that fits within the channel 62, and a narrow member 73 that connects the pin member 72 to the remainder of the bracket 70. The pin member 72 is sized and/or shaped to fit within the channel 62 and so as to be prevented from sliding out of the narrow slot 64. The bracket 70 further includes a hook portion 74 that extends under the lip 66 and into recess 68. The contacting surfaces of the brackets 70 and the guide portions 52 are preferably constructed of low friction materials and/or provided with bearings to ensure smooth and efficient sliding of the brackets 70 along the guide portions 52.

The brackets 70 further include locking mechanisms that can be engaged to prevent the brackets 70 from sliding or moving with respect to the guide portions 52, and disengaged to allow for the brackets 70 to slide or move along the guide portions 52. The embodiment of the bracket 70 depicted in FIG. 3 includes a locking lever 76 rotatably supported on a pin 78 within a cavity 75 in the bracket 70. The locking lever 76 includes a cam portion 79 that is configured to contact the top surface 60 of the guide portion 52 when the locking lever is in the locked position, as depicted in FIG. 3. The contact between the cam portion 79 of the locking lever 76 and the top surface 60 of the guide portion 52 prevents the bracket 70 from sliding on the guide portion 52. The locking lever 76 can be rotated in a clockwise direction, as viewed in FIG. 3, in order to disengage the locking mechanism by removing the contact between the cam portion 79 and the top surface 60, thereby allowing the bracket 70 to slide upon the guide portion 52. Alternative configurations will be readily apparent to one of skill in the art based upon the teachings set forth in the present disclosure.

As stated above, FIGS. 2A through 2D depict the motion of the window from a closed position (depicted in FIG. 2A) to an open and locked position (depicted in FIG. 2D). The window 20 begins in the closed and, preferably, locked position, when the window is positioned within the window opening 12 of the vehicle 10. In the closed position, the brackets 70 are locked in position by the locking levers 76 in order to prevent the brackets 70 from sliding on the guide portions 52.

As depicted in FIG. 2B, the window 20 is then unlatched and the window 20 and the connection members 30 are rotated upward about the transport member 40 until the window 20 is approximately horizontal. The brackets 70 are unlocked by rotating the locking levers 76 into the unlocked position, thereby allowing the brackets 70 to freely slide upon the guide portions 52.

As depicted in FIG. 2C, the window 20, the connection members 30, the transport member 40, and the brackets 70 are then slid forward on the guide portions 52. The window 20 is slid forward to a position such that the lower edge 28 of the window is forward of the hook-shaped devices 58.

As depicted in FIG. 2D, the window 20 and the connection members 30 are rotated downward until the lower edge 28 of the window contacts the guide portions 52. The window 20 is then slid rearward such that the lower edge 28 of the window is received within the hook-shaped devices 58. The brackets 70 are then locked in position by the locking levers 76 in order to prevent the brackets 70 from sliding on the guide portions 52. The window 20 is thereby in the open and locked position, which is remote from the window opening 12. Note that the hook-shaped devices 58 in combination with the locked brackets 70 prevent the window 20 from moving. Preferably the guide portions 52 and the hook-shaped devices 58 are coated with a soft (such as rubber, a rigid rubber-coated material, or other material with a elastic contact surface) and/or low friction material in order to prevent the window 20 from being scratched or cracked due to contact therewith. In the open and locked position, the window 20 is preferably oriented as depicted in FIG. 2D, such that the exterior surface 24 of the window 20 is directed upward, thereby sheltering the heating elements 23 on the interior surface 22 of the window 20 from the elements (rain, snow, etc.). The device used to engage the lower edge 28 of the window 20 can be constructed such that the hook portion can be rotated, removed, or otherwise moved out of interference with the lower edge 28 until such time as the window 20 is in the position depicted in FIG. 2D, at which time the hook portion is moved and locked into the position depicted in FIG. 2D. For example, the device used to engages the lower edge 29 can be configured such that they are movable (for example, by pivoting or retracting a locking or clamping jaw).

The window 20 can be returned to the closed position by simply reversing the steps depicted in FIGS. 2A through 2D.

As will be readily apparent to one of skill in the art, the transport system and connection members of the present invention can be constructed in a variety of configurations to achieve a variety of motions of the window, as long as the window is moved from the closed position to an open position remote from the window opening 12. FIGS. 4 through 7 depict various alternative embodiments of the vehicle and window system for a vehicle according to the present invention. It should be noted that the embodiments depicted and described herein set forth the preferred embodiments of the present invention, and are not meant to limit the scope of the claims hereto in any way.

FIG. 4 depicts an alternative embodiment of the brackets, which can be used in place of the brackets 70 described above. In this alternative embodiment, the ends of the transport member 40 have cam locking members 172 that are rotatably received within the brackets 170. The transport member 40 is non-rotationally connected to the connection member 30. When the window 20 is in the closed position within the window opening 12, the connection member 30, transport member 40, and cam locking members 172 are oriented as depicted in FIG. 4. In this orientation, the cam locking members 172 contact the top surfaces 60 of the guide portions 52, thereby preventing the brackets 170 from moving with respect to the guide portions 52. When the transport member 40 is rotated in a clockwise direction, as viewed in FIG. 4, such that the window is rotated upward, the cam locking members 172 are rotated out of contact with the top surfaces 60 of the guide portions 52, thereby allowing the brackets 170 to slide with respect to the guide portions 52. This embodiment replaces the locking levers 76 described above with respect to FIG. 3. The embodiment of FIG. 4 advantageously provides a cam locking mechanism that automatically locks the transport member in a fixed relation to the guide portion when the window is in the closed position and unlocks the transport member in relation to the guide portion when the window is in the open position. Note, however, a separate locking mechanism may be required to lock the position of the brackets 170 with respect to the guide portions 52 when the window 20 is in the open and locked position.

Figure 5:
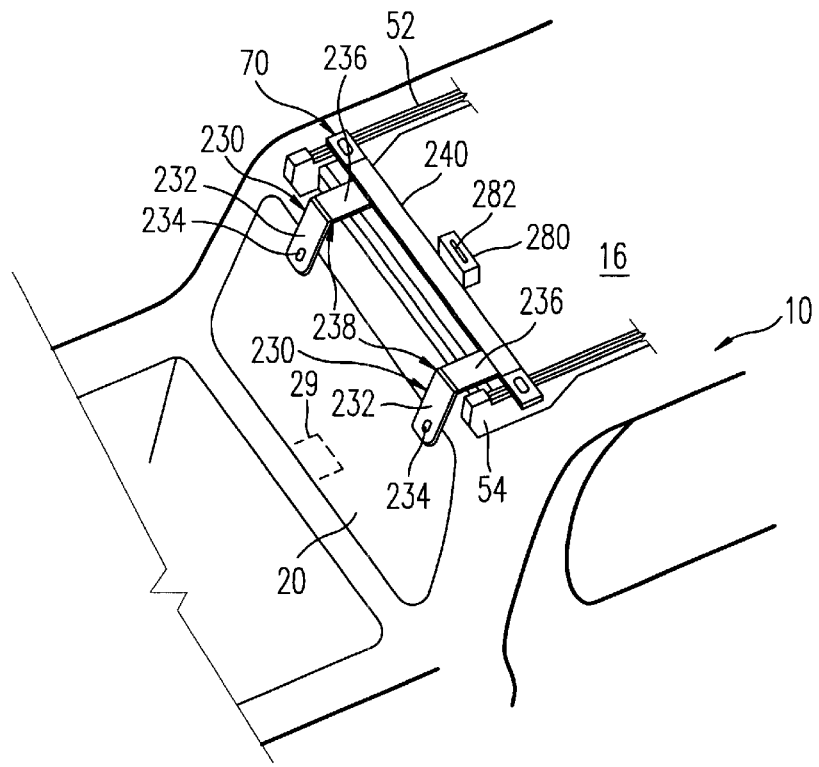
FIG. 5 is a perspective view of a transport member and connection members according to an alternative embodiment of a window system of the present invention.

FIG. 5 depicts an alternative embodiment of the connection members 230 and the transport member 240. This embodiment is particularly well suited for retrofitting or modifying an existing vehicle body. The connection members 230 include a first portion 232 having a hole 234 mounted to the window 20 in a manner similar to connection member 30 described above. The connection member 230 further includes a second portion 236 mounted to the transport member 240, which can be, for example, an existing roof rack bar. The first portion 232 and the second portion 236 are pivotally connected by joint 238. Note also that this embodiment is depicted as including a latch locking mechanism 280 that is mounted to the roof 16 of the vehicle 10 using conventional mounting methods. The latch locking mechanism 280 includes a slot 282 for receiving and locking in place the latch 29 on the window, when the window 20 is in the open and locking position. The latch locking mechanism 280 is provided in place of the hook-shaped device 58 described above. The latch locking mechanism 280 is provided with a release actuator (not depicted) that can be provided in the cabin of the vehicle 10 or connected to a key slot release actuator (not depicted) below the window opening 12.

Figure 6:
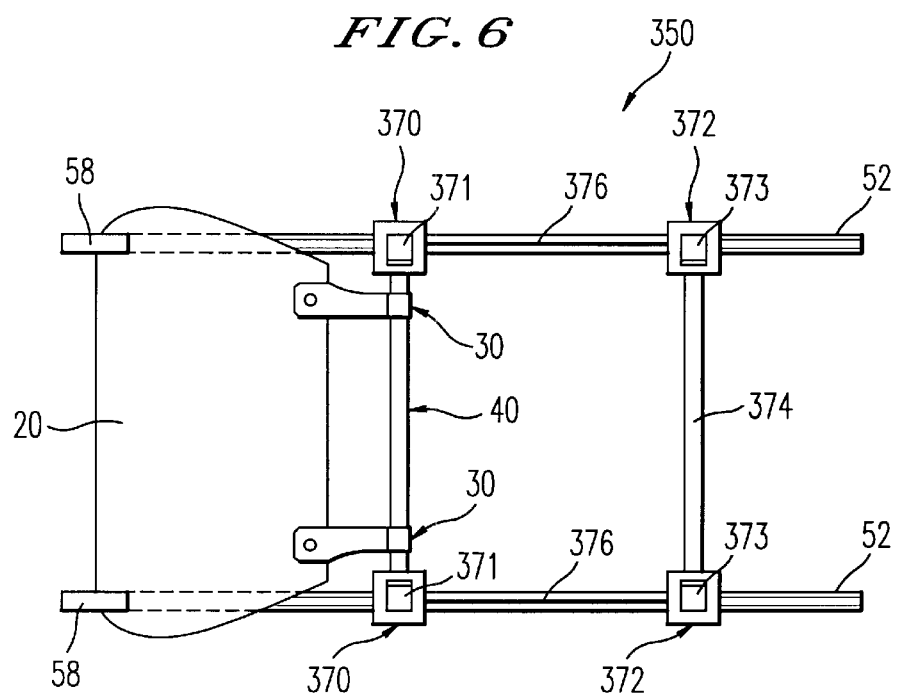
FIG. 6 is a top view of a transport system according to an alternative embodiment of the present invention.

FIG. 6 depicts an alternative embodiment of the transport system according to the present invention. This embodiment includes first brackets 370, which are structurally identical to brackets 70, and second brackets 372, which are also structurally identical to brackets 70. The first brackets 370 are interconnected by a first transport member 40, and the second brackets 372 are interconnected by a second transport member 374. The first transport member 40 is generally parallel to the second transport member 374. Each of the first brackets 370 is connected to one of the second brackets 372 by support members 376, which are configured in a generally parallel relationship, as depicted in FIG. 6. The transport members 40 and 374 are in a generally perpendicular relationship with the support members 376. The first transport member 40, the second transport member 374, and the support members 376 form a rectangular configuration that provides rigidity to the transport system 350. The first brackets 370 include locking mechanisms having locking levers 371, and the second brackets 372 include locking mechanisms having locking levers 373.

FIG. 7 depicts an alternative embodiment of the transport system according to the present invention. This embodiment includes guide portions 452 each fitted with a drive device 490 that is configured to move the transport member 40 attached to the bracket 70 along the guide portion 452. The drive device 490, which is preferably an electric motor, includes a pinion gear 492 configured to be selectively rotated by the drive device 490, and a rack gear 494 connected to the bracket 70. The drive device 490 and pinion 492 are housed within the guide portion 452, for example, at a position adjacent the base 454. The rack 494 is slidably received within a channel within the guide portion 452, where the channel is similar to the channel 62 depicted in FIG. 3 but is downwardly enlarged to provide open area below the pin member 72 to receive the rack 494. The pinion 492 and the rack 494 include gear teeth that mesh, such that as the drive device 490 rotates the pinion 492, the pinion 492 forces the rack to slide within the guide portion 452 and thereby move the bracket 70 along the guide portion 452. The drive device 490 is configured to selectively rotate the pinion 492 in both a counterclockwise direction and a clockwise direction, such that the drive device 490 can move the brackets 70 in both directions along the guide portion 452.

The window system depicted in FIG. 7 also includes a pair of telescopic support rods on either side of the window opening 12, with each telescopic support rod having a first end 495 adapted to mount to the vehicle 10 and a second end 496 mounted to a lower portion of the window 20. The telescopic support rod automatically pivots the window 20 out of the window opening 12 as the drive devices 490 move the brackets 70 along the guide portions 452. The first end 495 of the telescopic support rod is pivotally mounted by a joint 497 to an inner edge of the window opening 12, and the second end 496 of the telescopic support rod is pivotally mounted by a joint 498 to a lower edge 28 of the window 20. The joint 497 is located above the joint 498. Note that as the window 20 is pivoted by the telescopic support rods, the window 20 will be lifted above the end of the guide portion 452. The end of the guide portion 452 and the telescopic support rods will guide the window 20 into position above the roof 16 of the vehicle 10 as the window 20 is being moved forward towards the front of the vehicle 10 by the drive device 490. When the window 20 is raised, the telescopic support rods will swivel forward, raising the bottom edge of the window 20, clearing it from any obstructions, and proceed to guide the window up onto the roof 16 of the vehicle 10. Once the lower edge 28 of the window 20 is forward of the end of the guide portion 452, the drive device 490 will stop and the lower edge 28 of the window 20 will be held in position by the telescopic support rods. The embodiment depicted in FIG. 7 is particularly well suited for use with vehicles having window openings that are provided at an angle of 20° to 40° from vertical.

The drive device 490 can be provided with a remote actuation unit that controls the operation of the motor. For example, the drive device 490 can be connected via wire 491 to a remote actuation unit 499 toward the rear of the vehicle 10 and below the window opening 12. Additionally, the drive device 490 can be connected via wire 493 to a remote actuation unit (not depicted) in the cabin of the vehicle 10. The remote actuation unit can be configured to directly control the direction of the motor, or can be provided with a controller that automatically controls the drive device 490, with a single push of a button (or series of pushes of several buttons), to perform all of the motions necessary to move the window 20 from the closed position to the open and locked position, and vice versa.

As will be readily apparent to one of skill in the art based upon the disclosure set forth herein, various different drive mechanisms can be employed to perform this function. For example, a linear actuator (such as a hydraulically or pneumatically driven linear actuator), or a motor and jackscrew could be provided in the guide portions to drive the brackets along the guide portions. Additionally, the telescopic support rods can be alternatively provided as pneumatic or hydraulic actuators.

In its most basic embodiment, the present invention relates to a window system that provides a closed position where a window is positioned within a window opening, and an opened position where the window is moved out of the window opening and then moved to a position remote from the window opening. The present invention can be integrated into an existing roof rack system or the present invention can be mounted to a roof system that is separate from the roof rack system.

An alternative configuration of the invention disclosed herein can be constructed that does not necessarily include the window 20 and the connection members 30. For example, the embodiment depicted in FIG. 7 could be constructed without the window 20, the connection members 30, and the telescopic support rods (and corresponding connection joints). In this configuration, the drive devices 490 are used to move the transport member 40 along the guide portions 452 in the manner described above. Thereby, the transport member 40 can be utilized as a selectively adjustable luggage rack bar. Alternatively, the guide portions can be constructed with additional drive devices for driving additional transport members along the guide portions in the manner described above. For example, two transport members can be provided on the guide portions, with each transport members having a movement range including half of the length of the guide portions and each transport member being driven by either one or two drive devices. The various drive devices and corresponding transport members can be controlled either simultaneously or individually by remote actuation units as described above.

Numerous variations of the present invention are possible in light of the above teachings. It is therefore to be understood that, within the scope of the appended claims, the invention may be practiced otherwise than as specifically described herein.

What is claimed is:

1. A window system for a vehicle having a window opening, said window system comprising:
a window adapted to fit within the window opening;
at least one connection member connected to said window; and
a transport system having a transport member connected to said at least one connection member, said transport system mounted to the roof of the vehicle, said transport member being movably connected to a guide portion of said transport system such that said window is movable between a closed position where said window is positioned within the window opening, and an open position where said window is located at a position remote from the window opening.

2. The window system according to claim 1, wherein said at least one connection member has a first portion connected to said window and a second portion connected to said transport member, said first portion being rotatably connected to said second portion.

3. The window system according to claim 1, wherein:
said transport member is a rod; and
said connection member is pivotally supported by said rod.

4. The window system according to claim 1, wherein said guide portion of said transport system includes at least one rail, said transport member being slidably received by said at least one rail.

5. The window system according to claim 1, wherein said transport system includes a locking device configured to releasably lock said transport member in a fixed position in relation to said guide portion.

6. The window system according to claim 5, wherein said transport system includes a device configured to engage an edge of said window when said window is in said open position such that said window is locked in said open position.

7. The window system according to claim 1, wherein said transport system includes a device configured to engage an edge of said window when said window is in said open position such that said window is locked in said open position.

8. The window system according to claim 1, wherein said transport member includes a locking device configured to lock said transport member in a fixed relation to said guide portion when said window is in said closed position and unlock said transport member in relation to said guide portion when said window is in said open position.

9. The window system according to claim 8, wherein said locking device comprises a cam locking mechanism.

10. The window system according to claim 1, wherein:
said transport system includes a locking mechanism; and
said window includes a latch configured to engage a lock on the vehicle when said window is in said closed position, said latch being configured to engage said locking mechanism of said transport system when said window is in said open position.

11. The window system according to claim 1, wherein said transport system includes at least two transport members in a generally parallel relationship, said at least two transport members being connected by at least two support members, said at least two support members being configured in a generally parallel relationship, said at least two transport member being configured in a generally perpendicular relationship with said at least two support members.

12. The window system according to claim 1, wherein said transport system includes a drive device connected to said transport member and configured to move said transport member along said guide portion.

13. The window system according to claim 12, further comprising a support rod having a first end adapted to mount to the vehicle at an upper portion of the window opening, and a second end mounted to a lower portion of said window.

14. The window system according to claim 12, wherein said drive device has a remote actuation unit.

15. A vehicle comprising:
a vehicle body having a window opening and a roof;
a window configured to fit within said window opening;
at least one connection member connected to said window; and
a transport system having a transport member connected to said at least one connection member, said transport system being mounted to said roof of said vehicle, said transport member being movably connected to a guide portion of said transport system such that said window is movable between a closed position where said window is positioned within said window opening, and an open position where said window is located at a position remote from said window opening.

16. The vehicle according to claim 15, wherein:
said connection member is pivotally supported by said transport member;
said guide portion of said transport system includes at least one rail, said transport member being slidably received by said at least one rail;
said transport system includes a locking device configured to releasably lock said transport member in a fixed position in relation to said guide portion; and
said transport system includes a device configured to engage an edge of said window when said window is in said open position such that said window is locked in said open position.

17. The vehicle according to claim 15, wherein said transport member includes a cam locking mechanism configured to lock said transport member in a fixed relation to said guide portion when said window is in said closed position and unlock said transport member in relation to said guide portion when said window is in said open position.

18. The vehicle according to claim 15, wherein:
said transport system includes a locking mechanism; and
said window includes a latch configured to engage a lock on the vehicle when said window is in said closed position, said latch being configured to engage said locking mechanism of said transport system when said window is in said open position.

19. The vehicle according to claim 15, wherein said transport system includes at least two transport members in a generally parallel relationship, said at least two transport members being connected by at least two support members, said at least two support members being configured in a generally parallel relationship, said at least two transport member being configured in a generally perpendicular relationship with said at least two support members.

20. The vehicle according to claim 15, wherein said transport system includes a drive device connected to said transport member and configured to move said transport member along said guide portion, and said vehicle further comprising a telescopic support rod having a first end mounted to an upper portion of said window opening, and a second end mounted to a lower portion of said window.

* * * * *